United States Patent [19]

Patel

[11] Patent Number: 5,701,168
[45] Date of Patent: Dec. 23, 1997

[54] INVERSE TWISTED AND SUPER-TWISTED NEMATIC LIQUID CRYSTAL DEVICE

[75] Inventor: Jayantilal Shamjibhai Patel, Red Bank, N.J.

[73] Assignee: Bell Communications Research, Inc., Morristown, N.J.

[21] Appl. No.: 496,559

[22] Filed: Jun. 29, 1995

[51] Int. Cl.⁶ ................................................ G02F 1/1337
[52] U.S. Cl. ............................................................. 349/130
[58] Field of Search ................................ 359/77; 349/130

[56] References Cited

U.S. PATENT DOCUMENTS

| | | | |
|---|---|---|---|
| 5,150,236 | 9/1992 | Patel | 359/71 |
| 5,194,975 | 3/1993 | Akatsuka et al. | 359/73 |
| 5,477,358 | 12/1995 | Rosenblatt et al. | 359/77 |

FOREIGN PATENT DOCUMENTS 56-39522  4/1981  Japan ........................ 359/77

OTHER PUBLICATIONS deGennes et al., *The Physics of Liquid Crystals*, 2nd ed., (1993, Oxford), pp. 133–135, 261–294.

Scheffer et al., "Twisted Nematic and Supertwisted Nematic Mode LCDs," *Liquid Crystal Applications and Uses*, ed. Behadur, vol. 1, Chapter 10 (World Scientific, 1993), pp. 231–274.

*Primary Examiner*—William L. Sikes
*Assistant Examiner*—James A. Dudek
*Attorney, Agent, or Firm*—Lionel N. White; Joseph Giordano

[57] ABSTRACT

An inverse twisted or super-twisted nematic liquid crystal device in which the alignment layers on the two sides are homeotropic so as to regularly cause the associated linear liquid-crystal molecules to be, in the absence of an applied field, perpendicular to the alignment layers. Nonetheless, the alignment layers are rubbed or otherwise conditioned, preferably in relatively perpendicular directions, and the gap is filled with a liquid crystal having a negative dielectric anisotropy so that in the presence of a normally applied electric field the liquid crystals align perpendicularly to the applied field and are at their boundaries in parallel with the two perpendicularly aligned alignment layers, thereby forming a twisting structure within the cell gap. Thereby, in the absence of an applied voltage, light traverses the cell without effect upon its polarization. However, in the presence of an applied voltage, the light is waveguided by the liquid crystal having relatively displaced directors at the two alignment layers. Thereby, in the presence of perpendicularly aligned polarizers on the exteriors of the cell, the cell is dark in the absence of an applied voltage and becomes bright when a voltage is applied.

5 Claims, 4 Drawing Sheets

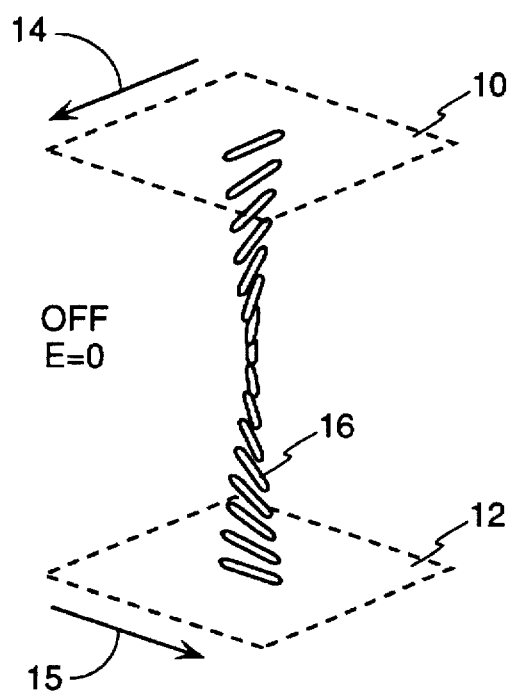
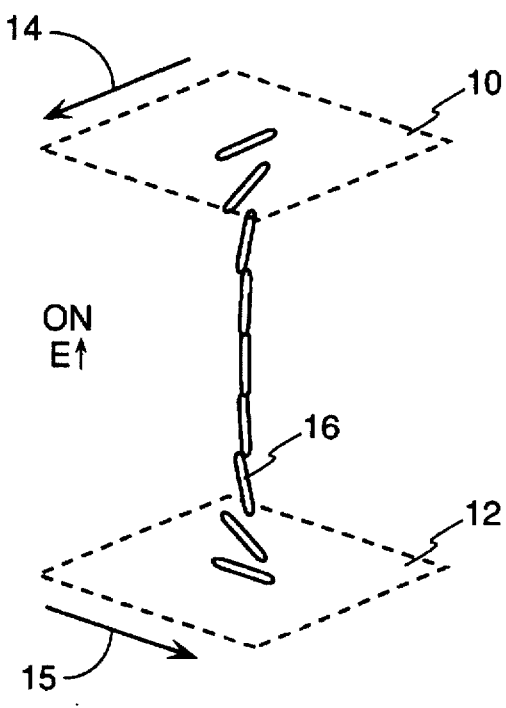
FIG. 1
(PRIOR ART)
FIG. 2
(PRIOR ART)

INVERSE TWISTED AND SUPER-TWISTED NEMATIC LIQUID CRYSTAL DEVICE

FIELD OF THE INVENTION

The invention relates generally to liquid crystals. In particular, the invention relates to nematic liquid crystal display devices.

BACKGROUND OF THE INVENTION

Conventional liquid crystal display devices utilize twisted nematic liquid crystal cells having a crystalline structure, for example, as illustrated in FIGS. 1 and 2, which contain liquid crystals which are forced into a twisted nematic configuration using appropriate boundary layers. A liquid crystal fills a narrow gap between two alignment layers 10 and 12. The two alignment layers 10 and 12 are rubbed in perpendicular directions 14 and 15 so that any of liquid crystal molecules 16 that are immediately adjacent to the alignment layers are anchored to the alignment layers with their longitudinal axes parallel to the respective rubbing directions 14 and 15. The type of alignment which is produced by using such an alignment layer is called homogeneous.

In the passive state illustrated in FIG. 1 with no voltage applied across the cell, the local average direction of the long axes of the liquid crystal molecules 16, called the director, gently twist between the two alignment layers 10 and 12 with the liquid crystal molecules 16 remaining parallel to the two alignment layers 10 and 12. If the product of the twist period d and the differential refractive index $\Delta n$ is long compared to the wavelength $\lambda$ of the light so as to satisfy the Mauguin condition $$\Delta n \cdot a > \lambda, \tag{1}$$

then the polarization of light traversing across the cell that is aligned with the input alignment direction follows the twist of the liquid crystal. On the other hand, when a voltage or electric field E is applied across the cell, as illustrated in FIG. 2, the typical nematic liquid crystals which have a positive dielectric anisotropy will tend to align with the electric field so as to be perpendicular to the two alignment layers 10 and 12. Nematic liquid crystals are generally shaped like a rod having a longitudinal axis. For a liquid crystal with positive dielectric anisotropy, the dielectric constant $\epsilon_\parallel$ parallel to the longitudinal axis is larger than the dielectric constant $\epsilon_{195}$ perpendicular to the axis, that is, $$\epsilon_\parallel - \epsilon_\perp > 0. \tag{2}$$

As a result, an electric field E tends to cause the liquid crystal to align with its longitudinal axis aligned with the field E. However, the liquid crystal has a finite elastic strength compared to the anchoring strength of the liquid crystal to the alignment layer 10 or 12 so the liquid-crystal orientation gradual bends relative to the transverse direction. Nonetheless, in large part, the liquid crystal 16 in the gap is parallel to the electric field E so that the gradual twist of FIG. 1 has been destroyed in FIG. 2 and light no longer has its polarization rotated.

In the usual use of these liquid crystal display cells, cross polarizers are set outside the two alignment layers 10 and 12, with the polarization axes aligned with the alignment direction of the adjacent alignment layer 10 or 12. Thereby, in the passive, bright off state of FIG. 1, one polarization of light is admitted to the cell, has its polarization rotated as it traverses the cell, and is transmitted through the exit polarizer. In the active, dark state of FIG. 2, in the absence of the required slow twist of the liquid crystal, the polarization of the traversing light is not rotated, and whatever light passes the entrance polarizer is blocked by the perpendicularly directed exit polarizer.

However, for low-density displays and data communication connect units, it is sometimes desired that the passive state be dark and the active state be bright. A dark passive state is particularly desirable when the operator must not be distracted by a meaningless display during a power failure. This functionality can be achieved in part by using parallel polarizers such that the polarization-twisted light of FIG. 1 is blocked and the polarization-untwisted light of FIG. 2 is transmitted. This design can be made to work if the cell thickness is well defined for a particular wavelength such that, in the passive state of FIG. 1, the polarization direction is rotated exactly 90° for this wavelength so as to be blocked by the parallel output polarizer. Aside from its wavelength sensitivity, which affects darkness, this configuration suffers other drawbacks. The parallel polarizer configuration is dependent upon wavelength because the degree of ellipticity of the exiting light also depends on the wavelength. As a result, a small part of the light is transmitted through the parallel output polarizer. Thus, the passive, dark state is inadequately black, and the cell is unusable for certain high performance applications such as photonic switching.

SUMMARY OF THE INVENTION

The invention can be summarized as a normally dark liquid-crystal cell for a display, optical transmission modulator, or other use in which the two alignment layers are conditioned at two angles so as to align the adjacent liquid-molecules at offset angles. However, the alignment layers comprise a homeotropic material which preferentially aligns the liquid-crystal molecules normal to the cell plane. The cell gap is filled with a liquid crystal manifesting negative dielectric anisotropy so that the long axes of the liquid-crystal molecules align perpendicular to the applied electric field. Thereby, in the passive state, the liquid-crystal molecules are perpendicular to the cell plane, and light is transmitted therethrough with no change in polarization. However, in the active state, the applied electric field causes the liquid-crystal molecules to align parallel to the cell plane. The alignment offset causes the liquid-crystal director to twist within the cell gap to thereby waveguide the light passing therethrough and twist its polarization. By the use of two polarizers set at angles corresponding to the adjacent alignment layers, the passive state is dark, not transmitting light, and the active state is bright, waveguiding light and transmitting it.

BRIEF DESCRIPTION OF THE DRAWINGS

FIGS. 1 and 2 are schematic representations of the liquid crystal orientation in a conventional twisted nematic liquid crystal display cell.

DETAILED DESCRIPTION OF THE PREFERRED EMBODIMENTS

The invention allows a nematic liquid crystal cell in which the active state is bright and the passive state is not only dark but can be made darker than in the prior art. A schematic representation of the liquid crystalline orientation of an embodiment of the invention is shown in FIG. 3 and 4.

Figure 3:
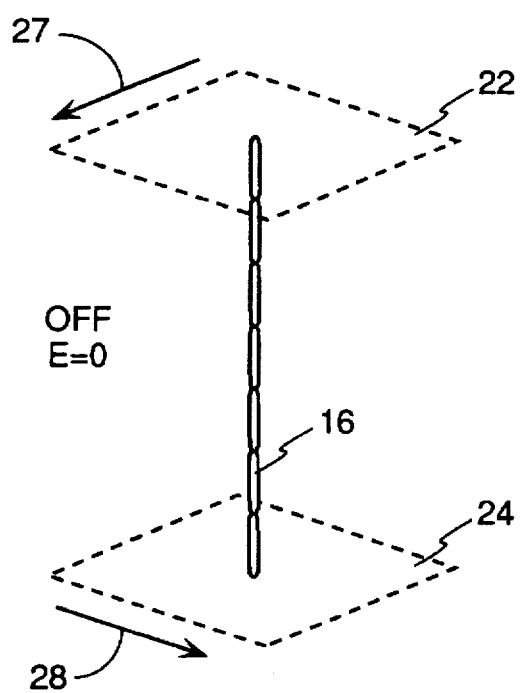
FIGS. 3 and 4 are schematic representations of the liquid crystal orientation in an embodiment of a inversely twisted nematic liquid crystal cell of the invention.
Figure 4:
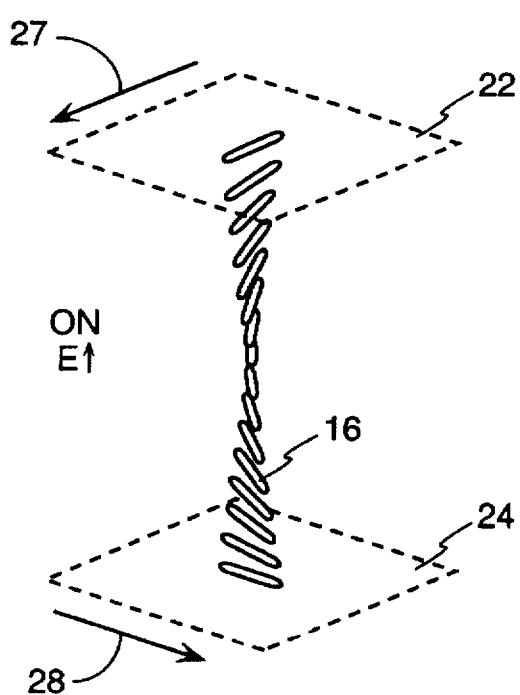

In the absence of electric field in the passive state of FIG. 3, the director 16 of the liquid crystal is normal to two homeotropic alignment layers 22 and 24 between which the liquid crystal is filled. Homeotropic alignment material generally induces adjacent liquid-crystal molecules to align perpendicularly to the surface. With the two ends of the director chain 16 aligned substantially perpendicular to the alignment layers 22 and 24, the entire gap is similarly aligned such that no polarization twisting is achieved.

The liquid crystal material is chosen to have a negative dielectric anisotropy. That is, the dielectric constant $\epsilon_{\perp 1}$ perpendicular to the long axis of the liquid crystal molecule is larger than the parallel dielectric constant $\epsilon_{\parallel 1}$ $$\epsilon_{\parallel}-\epsilon_{\perp}<0 \tag{2}$$

deGennes et al. discuss materials with negative dielectric anisotropy in *The Physics of Liquid Crystals*, 2nd ed., (1993, Oxford), pp. 133–135. Similar dielectric characteristics are possible with other liquids such as discotics, as described by DeGennes et al. ibid. at pp. 6–7. The low energy state for a liquid crystal subjected to an electric field E is for the direction of the larger dielectric constant to be parallel to the field E. Thus, when for the active state an electric field E is applied perpendicularly to the cell plane, as shown in FIG. 4, the liquid-crystal molecules 16 with negative dielectric anisotropy energetically orient perpendicularly to the electric field E, that is, parallel to the planes of the alignment layers 22 and 24.

Figure 5:
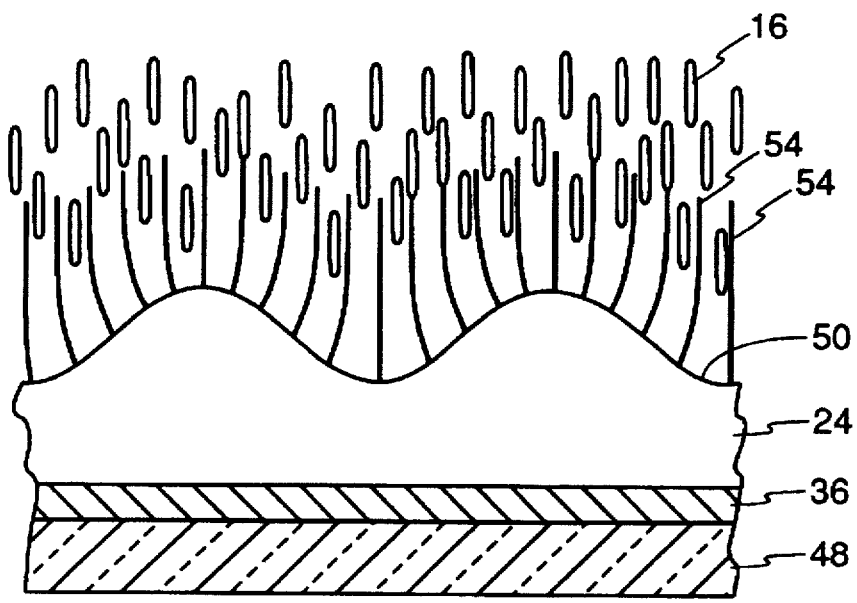
FIG. 5 is a cross-sectional view of a conditioned homeotropic alignment layer.

Further, the respective homeotropic alignment layers 22 and 24 are conditioned so as to preferably orient the adjacent liquid crystal in respective inplane directions 27 and 28 that are displaced from each other by an angle, for example, of 90°. This combination of homeotropy and in-plane alignment is illustrated in FIG. 5. The homeotropic alignment layer 24 deposited on a substrate 48 is, for example, rubbed in the direction perpendicular to the plane of illustration to form a grooved surface 50 of hills and valleys extending in parallel to the rubbing direction. The hills and valleys are formed at the upper surface of the homeotropic alignment layer 24 having a generally planar bottom adjacent to the substrate. Alternatively, the substrate could be formed with grooves prior to deposition of a conformal alignment layer so that the undulatory substrate surface is manifested in surface grooves in the alignment layer. For purposes of this invention, a rectangular substrate groove would be preferred.

The alignment layer can be thought of as grass on hills and valley, as shown in FIG. 5. The grass in this analogy is the octadecyltriethoxy silane, which is bonded to the surface, while the hills and the valleys are caused by the rubbing process or alternatively the underlying undulations in the substrate. The long chain structure of octadecyltriethoxy silane molecules resemble filaments 54 that are locally normal to the grooved surface so as to orient the liquid-crystal molecules 16 normal to the alignment layer in the absence of any electric field E.

Thus, in the absence of an electric field E, the grooves have little effect. However, if an electric field E induces the liquid crystal molecules 16 to tilt away from the normal, the grooves break the symmetry of the alignment layer 24 and provide a preferred direction for the tilt. That is, an electric field E will induce the liquid crystal molecules 16 of a liquid crystal with negative dielectric anisotropy to lie parallel to the grooves formed in the conditioned homeotropic alignment layer 24.

For the two perpendicularly conditioned alignment layers 22 and 24 of FIG. 4, the liquid crystal director for a liquid crystal of negative dielectric anisotropy in the presence of a normal electric field lies in the plane of the two alignment layers 22 and 24 sandwiching the liquid crystal but it is perpendicularly displaced at the two respective layers. Within this model, the director of the liquid crystal gradually rotates within the plane of the alignment layers 22 and 24 by the predetermined twist angle between the two alignment layers 22 and 24, all the time remaining parallel to the alignment layers 22 and 24. The twist angle is typically 90° for conventional twisted nematics and greater than 90° but less than 360° for super-twisted nematics. Such a gradual twist in the active state provides the polarization rotation similar to that of the conventional twisted nematic cell in the active state.

Figure 6:
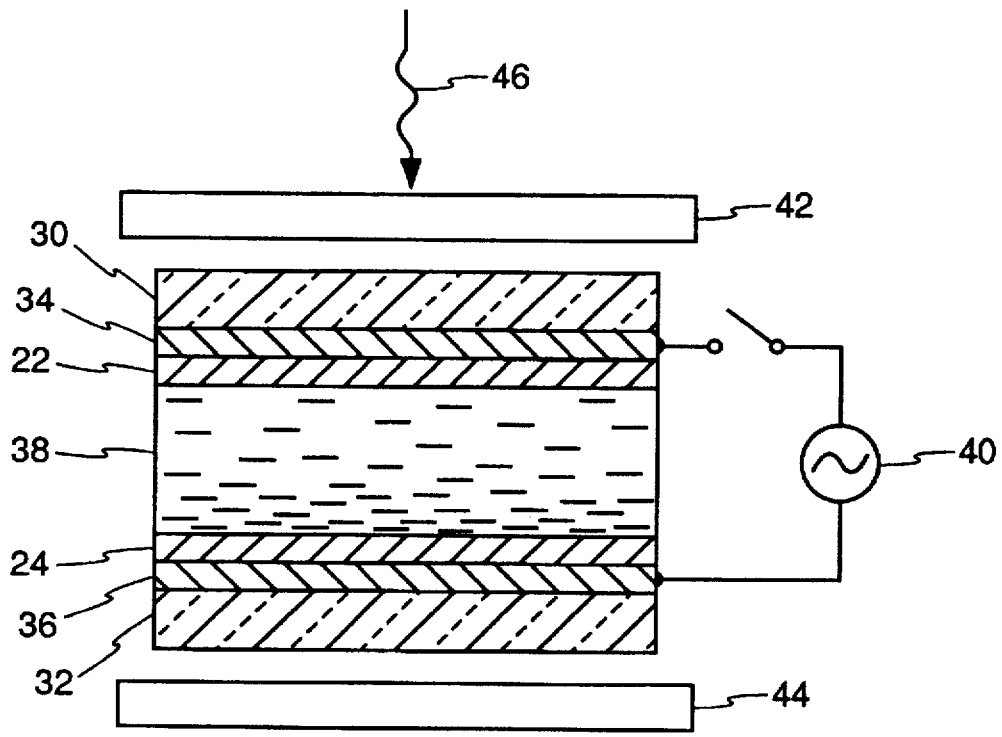
FIG. 6 is a cross-sectional view of liquid crystal cell of the embodiment of FIGS. 3 and 4.

The structure of an exemplary liquid-crystal cell of the invention is shown in the cross section of FIG. 6. Two assemblies are prepared, comprising respective transparent glass substrates 30 and 32, transparent electrodes 34 and 36, and homeotropic alignment layers 22 and 24. Polarizers 42 and 44 can be placed on the outsides of the liquid cell with the respective polarization directions arranged parallel to the alignment directions of the respectively adjacent alignment layers 22 and 24. That is, the two polarizers 42 and 44 have perpendicularly arranged polarization directions. Then, in the passive state of FIG. 3, light passing the input polarizer is not polarization rotated and is blocked by the output polarizer, but, in the active state of FIG. 4, light passing the input polarizer is polarization rotated and passes the output polarizer. That is, the passive state is dark and the active state is bright.

Thus, in the invention, the liquid crystal is normal to the alignment layer in the off state and parallel to it and aligned with the rubbing direction in the on state. This can be described in terms of the anchoring energy function $$W(\theta,\phi)=A\sin^2(\theta)+B\cos^2(\theta)\cos^2(\phi-\phi_0), \tag{4}$$

where $\theta$ represents the polar angle of the liquid crystal with respect to the plane of the alignment layer, $\phi$ represents the azimuthal angle of the liquid crystal within the plane of the alignment layer, $\phi_0$ represents the preferred azimuthal angle, that is, the alignment direction, and A and B are constants. With a homeotropic alignment layer and a nematic liquid crystal with negative dielectric anisotropy, the value of $\theta$ becomes 0 in the presence of a normal electric field, and energy is minimized when $\phi=\phi_0$ for the liquid crystals immediately adjacent to the alignment layer. That is, the adjacent molecules line up along the rubbing direction. On the other hand, in the absence of an electric field, $\theta=\pi/2$ with the result that the second term in Equation (4) disappears and the function is independent of $\phi$.

EXAMPLE 1

A first set of liquid-crystal cells of the invention were made and tested using a non-chiral nematic liquid crystal of negative dielectric anisotropy. Glass substrates coated with transparent indium tin oxide (ITO) electrode layers were cleaned in an oxygen plasma for 10 minutes. The electrode layers were then coated with a 5% solution of octadecyltriethoxy silane in ethanol with trace amounts of water, the solution having been aged for one day. The coatings were applied by spin deposition at 1000 rpm, and the coated plates were dried at 140° C. The liquid crystal was inserted into the cells by capillary actions while the cells were heated to 120° C. The gap between the alignment layers was maintained by 10 μm by glass spacers, as described by Patel in U.S. Pat. 5,150,236, which also describes other fabrication techniques.

In the first example, the liquid crystal was ZLI 1362, a non-chiral nematic available from EM Industries of Hawthorne, N.Y., which material demonstrates negative dielectric anisotropy at room temperature. One cell was fabricated with parallel rubbing directions. In the absence of an electric field, homeotropic alignment was observed with the optical axis being normal to the plane of the cell, as anticipated. An applied electric field caused the director in the middle of the cell to tilt in a uniform direction along the common rubbing direction. Insufficient rubbing (grooving) produced Schlierean texture with associated defects. The first example demonstrated some of the desired physics but was not usable for the desired light guiding and polarization twisting.

EXAMPLE 2

The second example similarly filled the cell with ZLI 1362, but the alignment layers were rubbed in perpendicular directions. At zero electric field, this example also exhibited homeotropic (normal) orientation. At high electric field, the bulk of the liquid crystal aligned parallel to the cell plane but fairly uniformly at 45° between the two rubbing directions. Thus, the electric field again produced the desired tilting. However, the desired twisted structure was replaced by a single in-plane orientation of the long axis of the molecules that was midway between the two rubbing directions.

Thus, in the bulk, an electric field causes the liquid crystal to switch between a normal orientation and an aligned planar orientation which can waveguide light but without twisting the polarization. Such behavior is explainable in terms of weak in-plane anchoring if the anchoring energy is much smaller than the twist elastic energy. In such a case, the surfaces cannot support the twist, but the twist is overcome by the elastic energy within very small distances of the alignment layers. The anchoring energy for the system studied to date is too weak to support the required 90° twist. Improved alignment material with increased anchoring strengths would provide the desired effect. Alternatively, an additional mechanism for supporting the twist would be helpful.

Nematic liquid crystals to which a chiral dopant has been added in non-racemic proportion, i.e., the solution is overall chiral, has a natural twist. A chiral molecule has an identifiable handedness so that a solution of such a molecule in a liquid crystal imparts an overall twist to the structure and the solution has the possibility of rotating the polarization of light traversing it. A racemic solution has equal proportions of opposite handedness so as to be overall non-chiral. The natural period depends on the concentration of the chiral dopant in the solution. The chiral effect is described by deGennes, ibid., pp. 261–294, and the resulting liquid crystal is called cholesteric.

For one embodiment of the present invention, the pitch of the natural cholesteric twist is chosen to produce a 90° twist for the cell gap or, in general, the desired amount of twist which is chosen with appropriate chiral dopant concentration and the rubbing directions on the two alignment layers. Then, the directors at the two alignment layers can be weakly held in alignment with the respective alignment layers with chiral dopant enforcing the required twist in the intervening gap in the presence of a field.

EXAMPLE 3

The previous ZLI 1362 liquid crystal was made chiral by the addition of a 0.5% weight fraction of ZLI 811, which is a chiral additive. The mixture produces a cholesteric with a rotation of 90° within the liquid-crystal cell. The chiral liquid crystal solution was filled into the gap of the cell described in the previous examples with the two alignment layers being perpendicularly rubbed.

Figure 7:
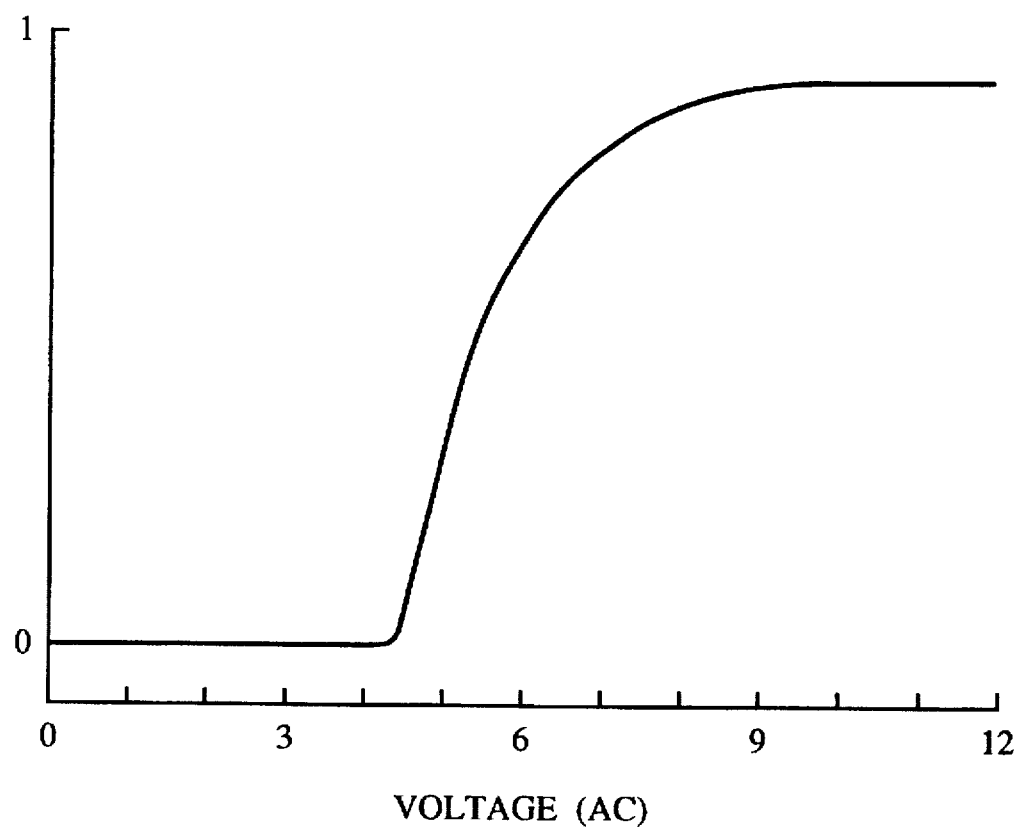
FIG. 7 is a graph of the optical transmission as a function of the applied voltage for the embodiment of the invention using a cholesteric liquid crystal.

The optical transmission for the chiral cell is shown in FIG. 7 as a function of the applied AC voltage. It is seen that for low or zero voltage, the transmission is low, but the transmission increases for higher voltages. That is, the off state is dark and the on state is bright, as is desired. The relatively high value of the turn-on voltage reflects the relatively small value of the negative dielectric anisotropy.

The display of a cell was patterned by patterning the applied electrodes. It showed the desired differential transmission in the presence of an applied voltage. Alternatively, one of the alignment layers could be patterned by differential rubbing of the patterned portions.

The above cell was designed for twisted nematics with a twist of 90° and assumed complete waveguiding. The invention can be applied as well to super-twisted calls in which the birefringent liquid crystal differentially affects the light's polarization but in a more complex way. As Scheffer and Nehring explain in "Twisted Nematic and Super-twisted Nematic Mode LCDs," *Liquid Crystal Applications and Uses*, ed. Bahadur, vol. 1, Chapter 10 (World Scientific, 1993), pp. 231–274, the Mauguin condition of Equation (1) is typically not exactly satisfied in reasonable cells with the result that the twisting liquid crystal does not completely determine the normal mode of the propagating light, which therefore becomes elliptical. Nonetheless, for certain values, given by Scheffer et al., of $$u = \frac{2d \cdot \Delta n}{\lambda}, \tag{5}$$

the elliptical modes of the non-Mauguin condition resynchronize to become linearly polarized at that particular distance of the gap so that transmission is maximized or minimized depending on the relative orientation of the polarizers. The first few such values of u, 1.732, 3.873, and 5.916, are obtainable with available liquid crystals. By comparison, the Mauguin condition assumes that u is very large. Typically, a super-twisted LCD relies upon a chiral liquid crystal to produce a total twist nearly equally to 270° but usually offset therefrom by a few tens of degrees. A chiral liquid crystal provides the required twist above 90°. Super-twisted liquid crystals afford high-contrast displays or modulators with minimal increase in complexity.

The invention thus provides, among other advantages, a liquid-crystal cell allowing a passive, dark state and an active, bright state.

What is claimed is:

1. A liquid crystal cell, comprising:

two alignment layers comprising homeotropic alignment material disposed generally in parallel and separated by a gap, the alignment material within the plane of each respective layer being aligned in a different respective alignment direction;

a chiral liquid crystal having a negative dielectric anisotropy filling said gap; and an electrode disposed on the outside of each of said alignment layers;

at least one of said alignment layers and electrodes being patterned, and an anisotropic dielectric constant, gap distance, wavelength, and difference between said alignment directions being chosen to yield a super-twisted liquid crystal cell producing substantial linearly polarized optical output.

2. A liquid crystal cell as recited in claim 1, wherein said liquid crystal produces a polarization twist of approximately 270° in an active state of said cell.

3. A liquid crystal cell as recited in claim 2 wherein the difference between said alignment directions are read is approximately 90°.

4. A liquid crystal cell as recited in claim 3 wherein said chiral liquid crystal has a chiral pitch producing a 90° twist between said two alignment layers.

5. A super-twisted liquid-crystal cell for selective transmission of light having a wavelength, $\lambda$, comprising:

two homeotropic alignment layers having respective alignment directions and being separated by a gap d; and a chiral liquid crystal filling said gap and having a negative dielectric anisotropy, $\Delta n$;

wherein a value of $$u = \frac{2d \cdot \Delta n}{\lambda}$$

is selected from the series 1.732, 3.873, 5.916.

* * * * *